(12) United States Patent
Hehl

(10) Patent No.: US 6,386,859 B1
(45) Date of Patent: May 14, 2002

(54) INJECTION MOLDING MACHINE WITH AN EXTRACTOR

(76) Inventor: Karl Hehl, Arthur-Hehl-Str. 32, D-72290 Lossburg (DE)

( * ) Notice: Subject to any disclaimer, the term of this patent is extended or adjusted under 35 U.S.C. 154(b) by 0 days.

(21) Appl. No.: 09/545,828

(22) Filed: Apr. 10, 2000

Related U.S. Application Data

(63) Continuation of application No. 09/171,205, filed as application No. PCT/EP97/01737 on Apr. 8, 1997, now abandoned.

(30) Foreign Application Priority Data

Apr. 15, 1997 (DE) .......................................... 196 14 804

(51) Int. Cl.⁷ ............................................... B29C 45/42
(52) U.S. Cl. ..................... 425/556; 425/438; 425/444
(58) Field of Search .............................. 425/438, 444, 425/556, DIG. 5; 264/334

(56) References Cited

U.S. PATENT DOCUMENTS

| | | | |
|---|---|---|---|
| 3,773,457 A | 11/1973 | Badoux et al. | |
| 4,545,753 A | 10/1985 | Hehl | |
| 4,781,571 A | * 11/1988 | Heindl et al. | 425/556 |
| 4,787,841 A | * 11/1988 | Simon | 425/556 |
| 5,334,009 A | 8/1994 | Urbaneck et al. | |

FOREIGN PATENT DOCUMENTS

| | | |
|---|---|---|
| EP | 0 218 101 A1 | 4/1987 |
| EP | 0 359 013 A2 | 3/1990 |
| EP | 0 382 612 A1 | 8/1990 |
| EP | 0 624 448 A1 | 11/1994 |
| JP | 63262217 | 10/1988 |
| WO | WO 92/19434 | 11/1992 |

OTHER PUBLICATIONS

Bernd Kunz, Plastics and Rubber, 1976, Issue 4, pp. 281–284.

* cited by examiner

*Primary Examiner*—Nam Nguyen
*Assistant Examiner*—Donald Heckenberg
(74) *Attorney, Agent, or Firm*—Venable; George H. Spencer; Robert Kinberg

(57) ABSTRACT

A mold-clamping unit accommodates an injection mold. The mold clamping unit includes a mold clamping chamber and a clamping mechanism. A crank element with a crank guide defines a guide path curved away from the clamping axis and has a longitudinal extension substantially parallel to the clamping axis. A drive unit moves the extractor along the crank guide and has a driving movement substantially parallel to the clamping axis. A guide unit is connected to the drive unit and the extractor and is guided at two locations on the crank guide. The first end of the drive unit is pivotably attached to the crank element and the second end of the drive unit is attached with hinges to the guide unit. The driving movement moves the guide unit along the guide path for moving the extraction mechanism in and out of the injection mold.

11 Claims, 7 Drawing Sheets

INJECTION MOLDING MACHINE WITH AN EXTRACTOR

CROSS REFERENCE TO RELATED APPLICATIONS

This application is a Continuation of U.S. Ser. No. 09/171,205, filed Oct. 15, 1998, now abandon, which is a National Stage Filing of PCT/EP97/01737, filed Apr. 8, 1997, which claims priority to German Patent Application 196 14 804.9, filed on Apr. 15, 1997, the disclosed subject matter of which is incorporated herein by reference.

BACKGROUND OF THE INVENTION

1. Field of Invention

The invention relates to an extractor for injection-molding machine for processing plastifiable compounds.

2. Prior Art

An injection molding machine of the aforementioned type is described in European Patent 0 624 448 A1, wherein the extractor therein is guided inside a crank member with an involved, three-dimensional, curved cylinder surface. The extraction means for the above extractor is arranged crosswise to the clamping axis. As a result, further space is needed in addition to the mold-clamping chamber, which space also necessitates an additional protective device. Thus, in the exemplary embodiment shown in FIGS. 11–14, a considerable expenditure is required to arrange the extractor underneath a corresponding protective device that is required in most industrial countries. The extractor itself is guided with a guide pin inside a crank guide. However, the actuation element in connection with the two drive motors requires additional space, since the two drive motors are not designed to be pivotable, nor is the actuation element itself guided inside the crank guides.

An extractor is known from U.S. Pat. No. 3,773,457, which is guided by a crank that extends essentially crosswise to the clamping axis. In this case, additional space is also required in the plane perpendicular to the clamping axis, which space would have to be covered by a protective device if this principle were to be transferred to an injection-molding machine. The additional space is furthermore required because the crank guide and the point of contact for the drive unit are separate, which is made clear by a comparison of FIGS. 3 and 4.

An injection-molding machine with an extractor is furthermore disclosed in the European Patent A 359 013. The extractor therein is a handling device, which is designed to remove molded articles from the mold-clamping chamber. For that purpose, a multi-axis system is provided, which permits an accurate removal of the molded articles as well as an exact depositing of the molded articles in receiving openings. Apart from the coordination of the three axes, an amount of space is required above the injection-molding machine, which should not be underestimated and, for the most part, requires a customized production of the protective device.

An extractor with two axes is known from European Patent A 218 101, wherein the second axis in the symmetry plane for the injection-molding unit is submerged perpendicular to the dividing plane. The perpendicular axis in this case also requires a considerable amount of space.

SUMMARY OF THE INVENTION

Starting with this prior art, it is the object of the present invention to create an extractor for an injection-molding machine of the aforementioned generic type, which requires less space.

This object is solved with an injection-molding machine for processing plastifiable compounds, comprising: a mold-clamping unit for accommodating an injection mold, the mold clamping unit including a mold clamping chamber and a clamping mechanism for opening and closing the injection mold in the mold clamping chamber in a direction of a clamping axis; an extractor comprising an extraction means for removing articles produced during an injection molding process from an opened injection mold; a crank element with a crank guide defining a guide path curved away from the clamping axis and having a longitudinal extension substantially parallel to the clamping axis; a drive unit for moving the extractor along the crank guide, said drive unit having a driving movement and including a first end and a second end, said driving movement being substantially parallel to the clamping axis and the longitudinal extension of the crank guide; and a guide unit connected to the drive unit and the extractor, said guide unit being guided at least at two locations on the crank guide, wherein the first end of the drive unit is pivotably attached to the crank element and the second end of the drive unit is attached with hinges to the guide unit, and wherein the driving movement of the drive unit moves the guide unit along the guide path, for moving the extraction means in and out of the injection mold.

The extractor is essentially activated by means of a drive unit and is positioned in the mold-clamping chamber with the aid of a crank guide, which essentially extends parallel to the clamping axis. The crank guide operates jointly with the drive unit, so that no additional space or very little additional space is required. The basic structural requirements for installing the extractor are therefore already provided by the areas claimed for the injection-molding machine. As a result, the extractor can be arranged underneath existing protective devices, so that existing machines can be retrofitted at any time without problems.

According to the cited references, not only was additional space required for the extractor, which had to be covered with a separate protective device, but involved deflection means were also provided to achieve a static determination of the drive unit. Above all, the drive unit according to our application is positioned such that it is articulated at both ends. For a static determination and to be able to guide the extractor with precision to the extraction point, the guide unit itself nonetheless must be positioned in at least two locations inside the crank guide in such a way that an unambiguous position is ensured for any operational state. At the same time, the crank guide and the drive unit are arranged such that the main movement direction and the longitudinal extension are in the direction of the clamping axis, so that the extractor does not require additional space when it is pivoted out. Despite this, the extractor can be assembled easily from a few structural elements.

BRIEF DESCRIPTION OF THE DRAWING

Shown are in.

DESCRIPTION OF THE PREFERRED EMBODIMENTS

Figure 1:
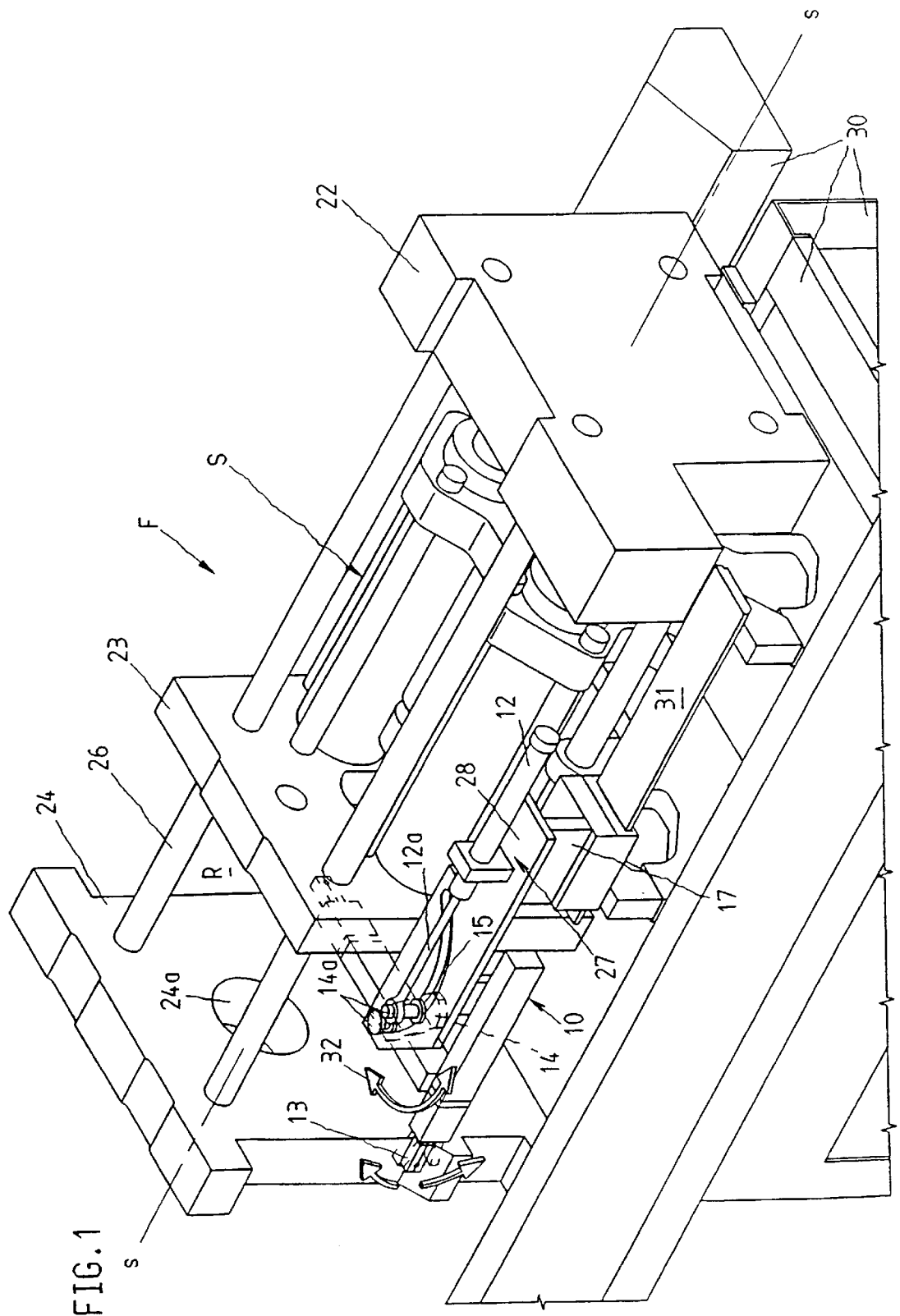
FIG. 1 A mold-clamping unit, comprising an injection-molding machine with an extractor attached thereto, shown in a three-dimensional view.

In the following, the invention is explained in further detail with examples and by referring to the enclosed drawings. However, the embodiments represent only examples, which are not designed to limit the inventive concept to a specific physical arrangement.

The Figures show a mold-clamping unit F for an injection-molding machine for processing plastifiable compounds, such as plastic materials, powdered compounds or ceramic compounds. The injection-molding machine comprises a stationary mold carrier 24 and a movable mold carrier 23, which can be moved by means of a clamping mechanism S. An injection mold M can be inserted into a mold-clamping chamber R between the mold carriers. This injection mold can be closed and opened by means of a clamping mechanism S, so as to form a mold cavity. The clamping mechanism S is supported by means of a support element 22, which is linked in the exemplary embodiment via crosspieces 26 to the stationary mold carrier 24. Alternatively, optional force-transmission elements are conceivable, which also permit free access to the mold-clamping chamber R, without the crosspieces 26. The compound is normally injected into the mold by means of an injection-molding unit, not shown in the drawing, and via the through opening 24a of the stationary mold carrier 24.

Figure 2:
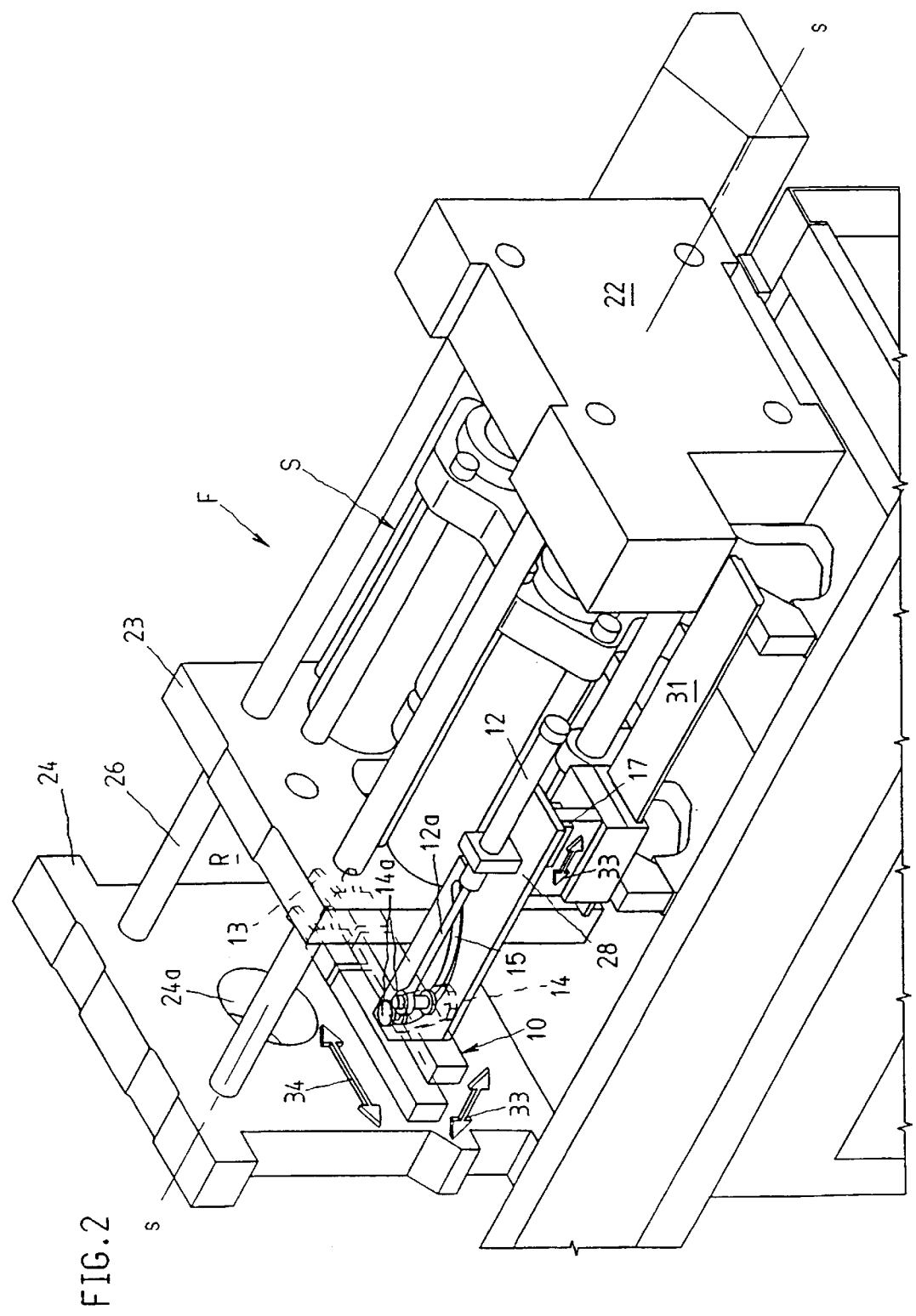
FIG. 2 A representation according to FIG. 1, wherein the extractor can additionally by moved in the direction of the clamping axis.
Figure 3:
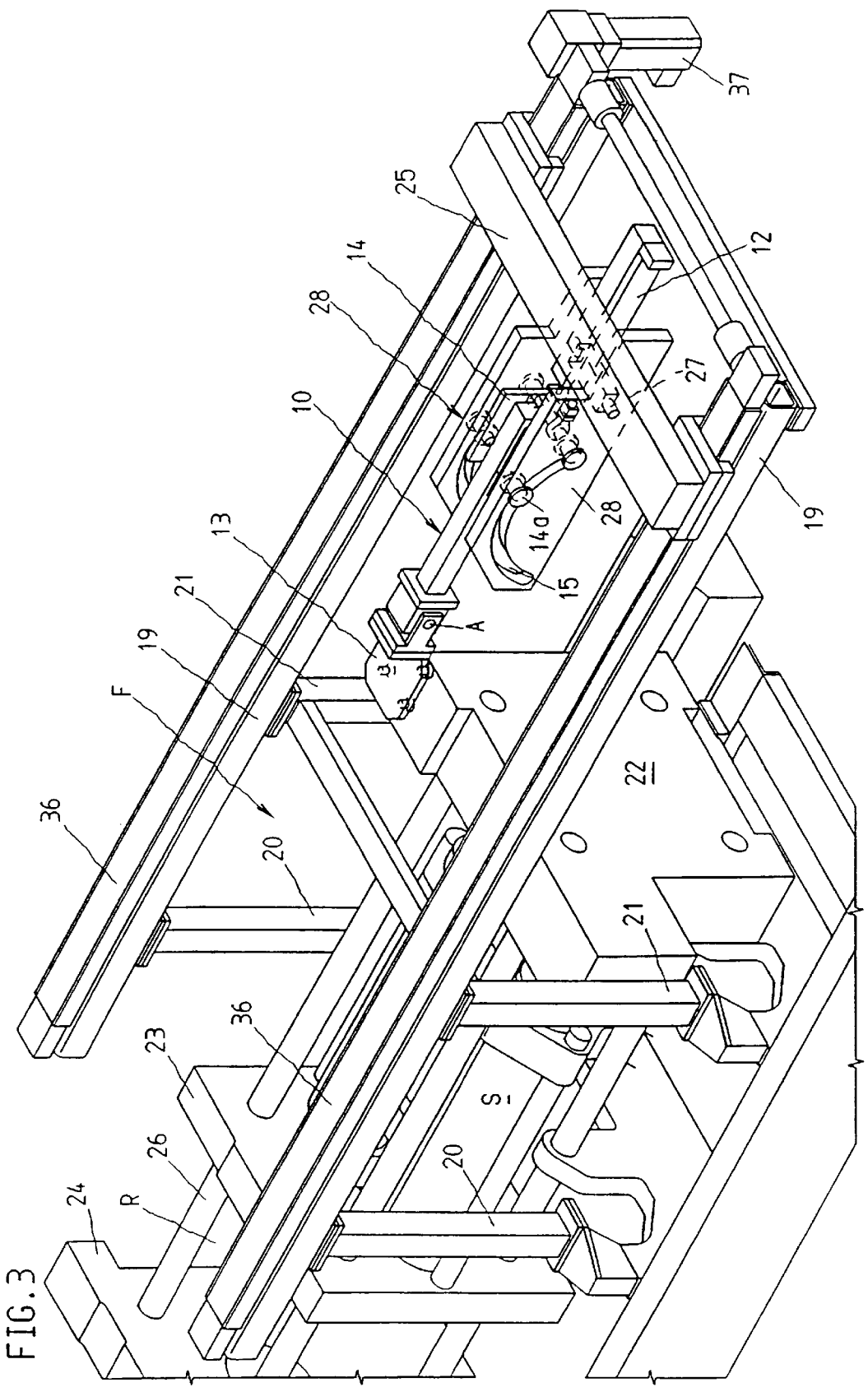
FIG. 3 An additional exemplary embodiment of an extractor, arranged on a support frame and shown in a view according to FIG. 1.

All exemplary embodiments show an extractor 10 for removing articles produced during the injection molding, such as slips and/or molded articles 11, from the opened injection mold M. An extraction means 13 for the extractor 10 can have the form of a gripper, as shown in FIGS. 1 and 2, but can also have other optional designs, e.g. a pneumatically activated suction device, as shown in FIG. 3. With this extractor 10, it is possible on the one hand to remove slips with a picker, or it is possible to handle molded articles, regardless of whether they are usable or unusable articles. The extractor 10 is operated by way of a drive unit 12, which can be moved along a guide track, essentially parallel to the clamping axis s—s. With respect to this, FIG. 1 clearly shows the drive unit that is arranged parallel to the clamping axis s—s and, at one end, is arranged such that it can pivot around a pivoting axis 27 on a crank element 28. As shown in the drawing, the crank element 28 can comprise the crank guide 15. However, it is also conceivable to have another arrangement, for which the crank element 28 is the mold-clamping unit or another structural component. In that case, the pivoting axis is provided at one location and the crank guide at another location of the structural component, wherein it is not necessary that both locations belong to the same structural component. The drive unit 12 in the exemplary embodiment is a piston-cylinder unit, having a piston rod 12a that functions as the other end of the drive unit and operates jointly with a crank guide 15 of a guide unit 14. The drive unit 12 in this case is fastened such that it can be pivoted on the crank element 28 and is mounted with hinges on the guide unit 14. With this other end, the drive unit 12 acts upon the guide unit 14 for the extractor 10. When activating the drive unit, the guide unit 14 moves along the guide track in the form of crank guide 15, which curves away from the clamping axis, so that the extraction means 13 is moved into or moved out of the mold-clamping chamber R. It is preferable in this case if the crank guide is designed so as to extend over a level plane. However, other embodiments are also conceivable, if required by the respective application purpose. Thus, three-dimensional crank guides can also be used. However, in most cases this is not necessary since the problem rarely occurs owing to the fact that guide unit 14 is guided at two locations within the crank guide 15.

In order to achieve static determination, the guide unit 14 is positioned with guide bolts 14a in at least two locations in the crank guide 15, thereby resulting in an exact guidance of the extraction means 13 and an unambiguous position for each operating state, despite the articulated positioning of drive unit 12.

The extractor can engage horizontally in the mold-clamping chamber R, as shown in FIGS. 1 and 2. However, it can also engage vertically, provided it is supported in a corresponding manner on the injection-molding machine. The arrangement can conceivably also be positioned as shown in the exemplary embodiment in FIGS. 1 and 2 with the aid of the support rail 31 and pivotable, such that it can be optionally pivoted by the user of the machine to optimize the required space and, for example, obtain free access to the mold-clamping chamber. In any case, the extractor 10 just barely extends into the mold-clamping chamber or the edge regions in front or above the mold-clamping chamber. The extractor 10 with its drive unit 12 is arranged inside the vertical or horizontal projection of the injection-molding machine, which is arranged crosswise to the clamping axis s—s. Even in combination with the movement space, necessary for activating the drive unit 12 and the extractor 10, the extractor 10 according to FIG. 6 can be arranged underneath a standard protective device that is unchanged relative to the protective device 16 on the machine itself. Thus, no additional space beside or above the machine is required.

While the extractor in FIG. 1 can be pivoted into the mold-clamping chamber R according to arrow 32, an additional mold-removal lifting movement is provided in a further stage according to FIG. 2 and the arrow 33. For this, the drive unit 12 is arranged on a carriage 17 that can be moved in the direction of the clamping axis. As a result, it is possible for the extraction means 13 to grip the molded article and/or the slip 11 and remove it from the mold, as shown clearly by the two positions for the extractor in FIG. 2. Following this, the crank guide 15 is activated and the extraction means is moved from the end position of drive unit 12 in the extracting position in the injection mold to the other end position in an ejection position and/or transporting position outside of the mold-clamping chamber R. The ejection position is arranged such that slips can be re-processed, for example via a crusher. In the event that the space between the mold halves is not sufficient for a space-saving pivoting out of extractor 10, the part taken from the mold can additionally be moved out of the cramped region in the mold-clamping chamber R with a movement according to arrow 34 and prior to the actual pivoting movement, preferably by shortening the extractor. An optional drive mechanism, which is not shown in the drawing, can be provided for this short lifting movement.

By arranging the drive unit movably on the carriage 17, it is possible to create a movement combination that permits a nearly rectilinear withdrawal of the extraction means 13 from the mold-clamping chamber R (compare the explanations to FIGS. 5a–5d below), despite the pivoting in of the extractor into the mold-clamping chamber. The mobility and related options, however, can be increased further in that the extractor 10 is additionally guided movably on a support frame. A support frame of this type is shown in FIG. 3, which preferably consists of two carrier crosspieces 19 on which are provided guide rails 36 for a cross slide 25. According to FIGS. 3, 4, the carrier crosspieces 19 extend past the longitudinal extension of the mold-clamping unit F toward the back. As a result, the cross slide 25 can move the extractor 10 from an extracting position, via the injection mold M to a depositing position behind or above the mold-clamping unit. The two carrier crosspieces 19—if necessary a configuration with only one carrier crosspiece is conceivable as well—are supported via respectively two support crosspieces above the mold-clamping unit F. The rear support crosspiece 21 is located at the level of the supporting element 22 for the clamping mechanism, while the front support crosspiece 20 is arranged according to FIG. 3 behind the movable mold carrier 23, in the position that is farthest to the rear. This relatively short support is made possible by the simple design of the extractor, used herein as a handling device, since essentially only one drive mechanism must be moved, which also contributes to a reduction in the mass inertial forces. As a result, the extractor 10 can be used as a full handling device.

The crank element 28 is arranged on the cross slide 25, such that it projects forward, which is necessary in itself to attach the crank guide 15. However, it also allows the carrier crosspiece 19 to project only slightly into the mold-clamping chamber R, which considerably facilitates access to the mold-clamping chamber R. The cross slide 25 itself can be moved, for example, with the aid of an endless chain that is not shown in the drawing and by means of drive 37.

Figure 5A:
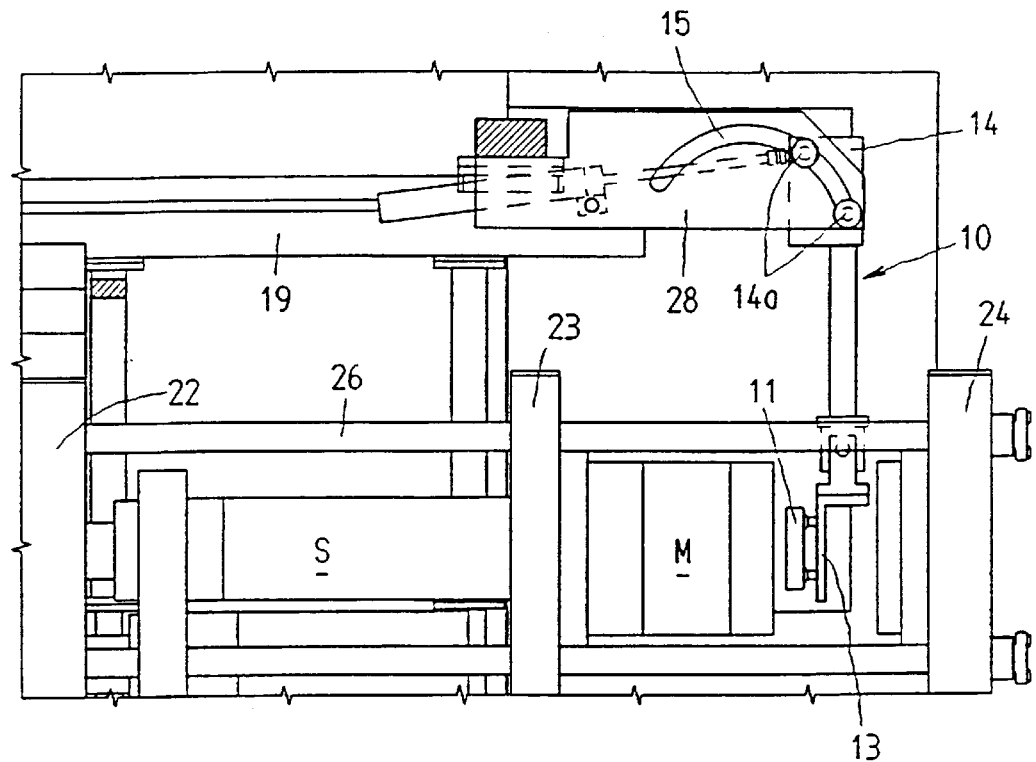
FIGS. 5a–5d A schematic view of the movement sequence for the extractor.

The FIGS. 5a–5d demonstrate the extractor option and also show clearly that the extractor 10 barely projects over the crank element 28 in upward direction. Thus, it can be arranged underneath a protective device 16 as shown in FIG. 6. In FIG. 5a, the extraction means 13 of the extractor 10 removes a molded article 11 from the opened injection mold M. For this, the guide unit 14, which is guided with guide bolts 14a in the crank guide 15, is in its end position.

Figure 4:
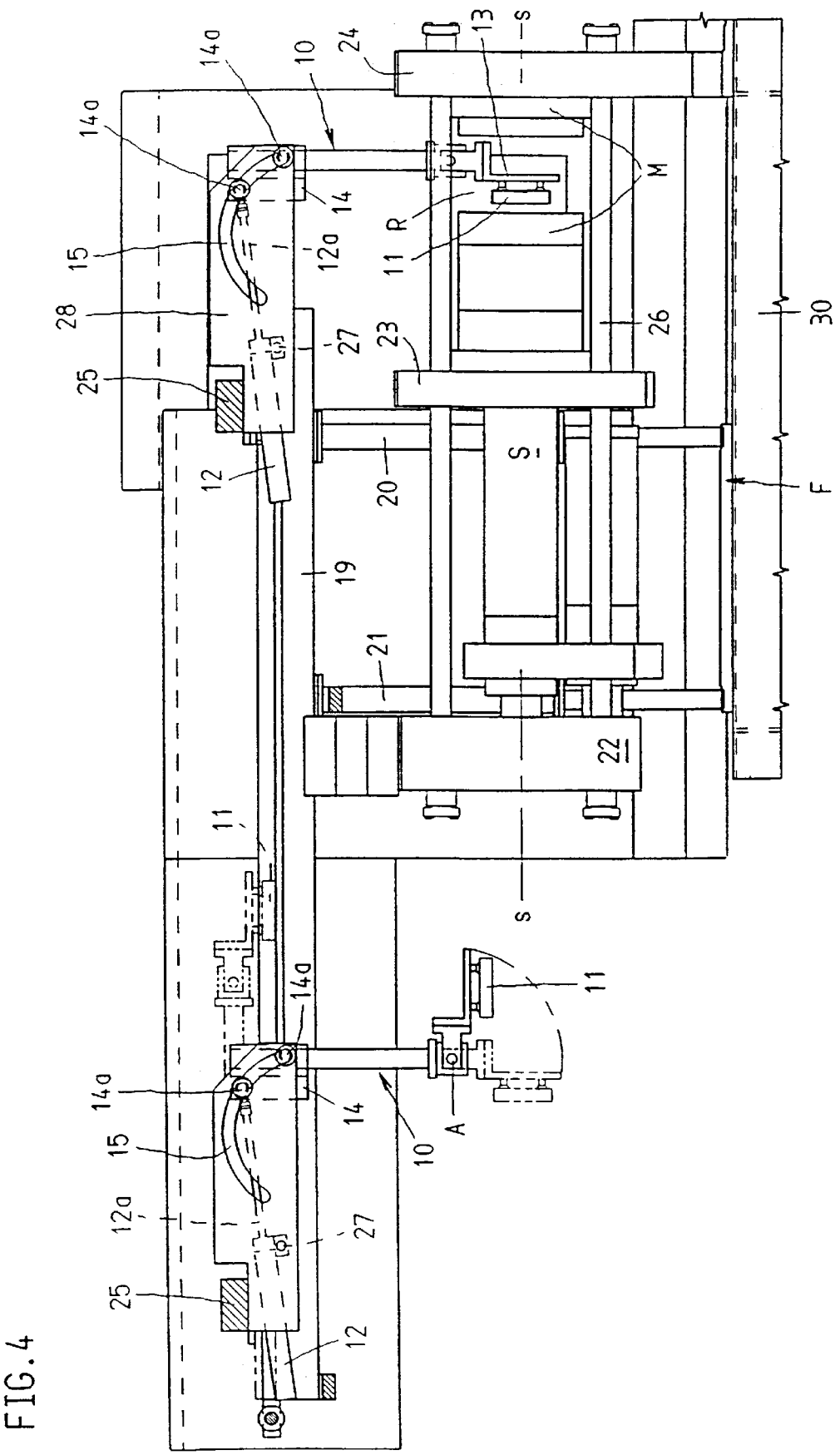
FIG. 4 The mold-clamping unit according to FIG. 3, in a view from the side.
Figure 5B:
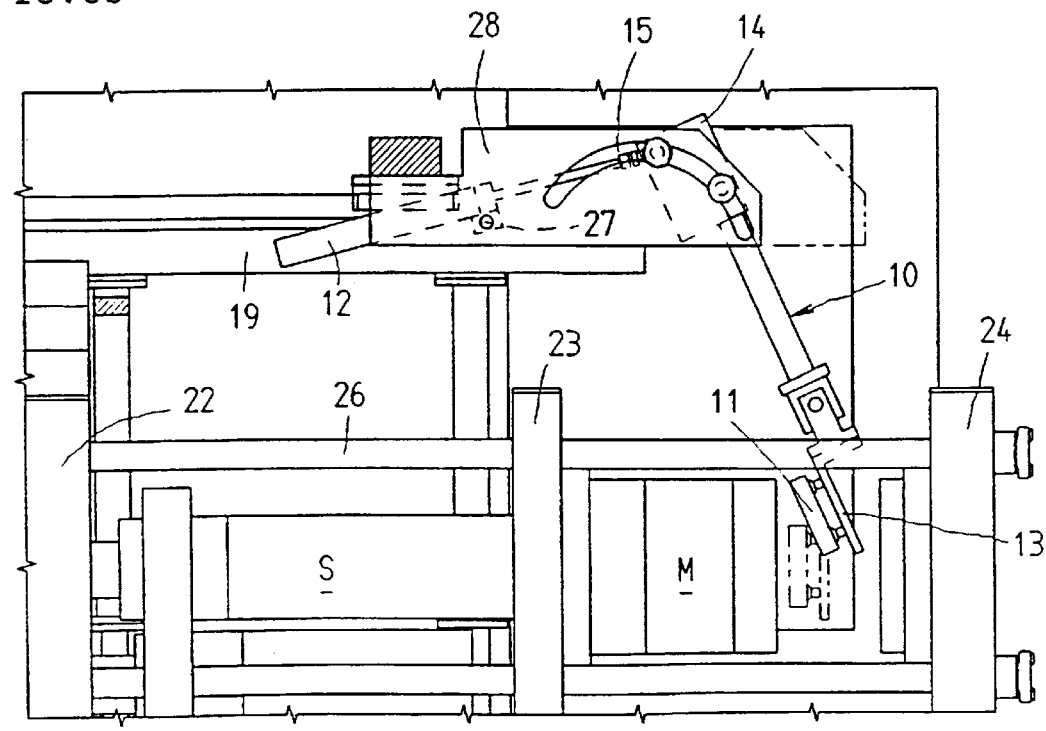
Figure 5C:
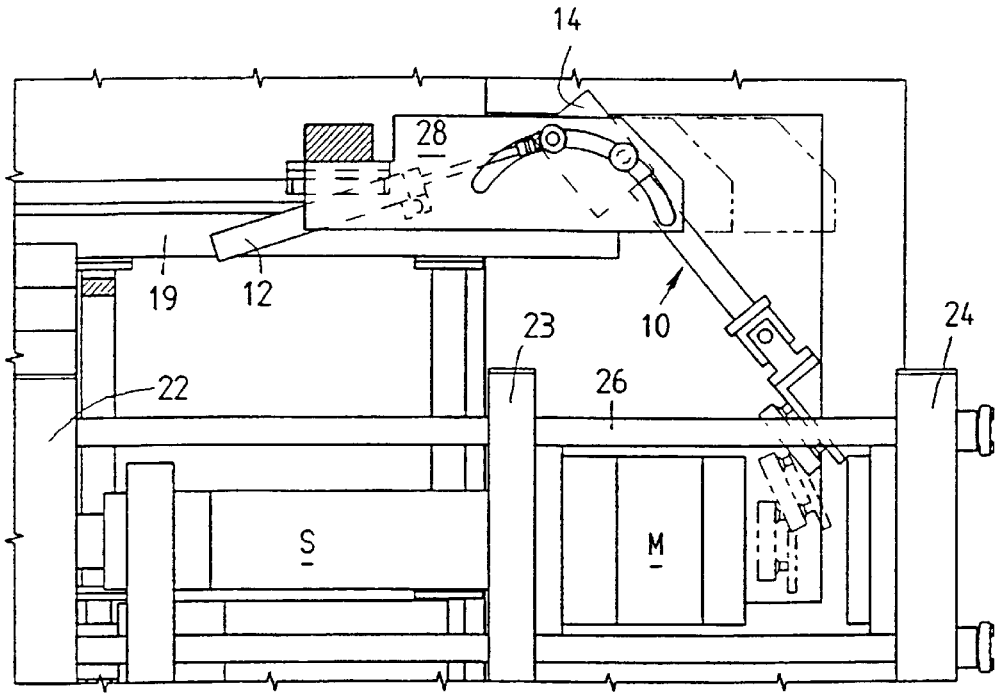
Figure 5D:
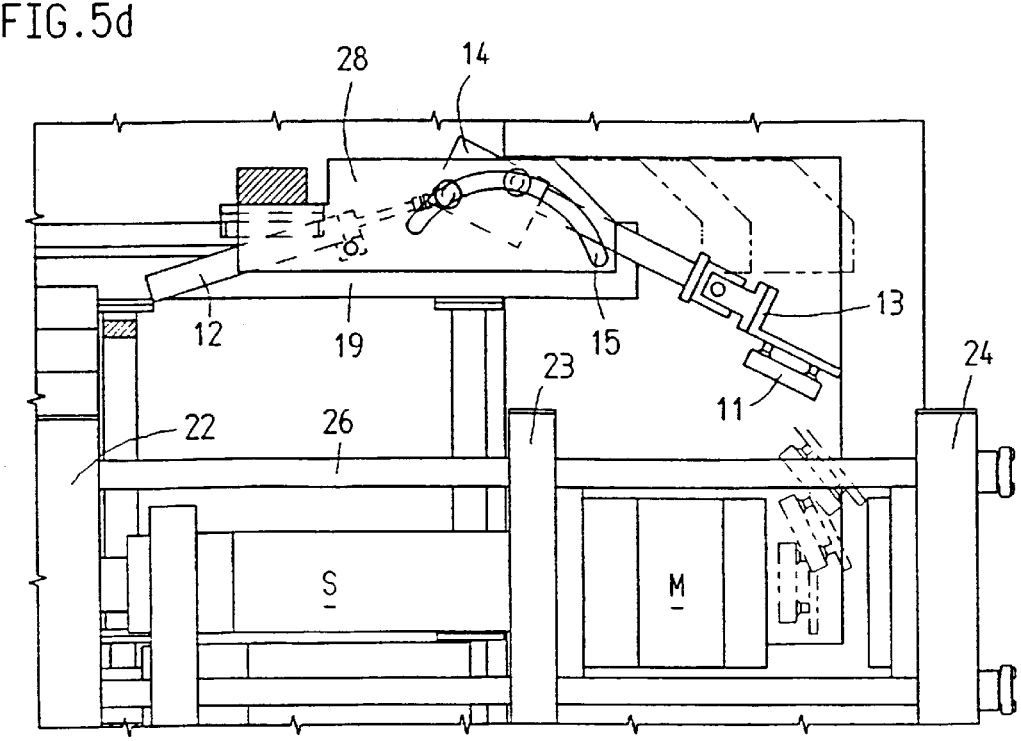
Figure 6:
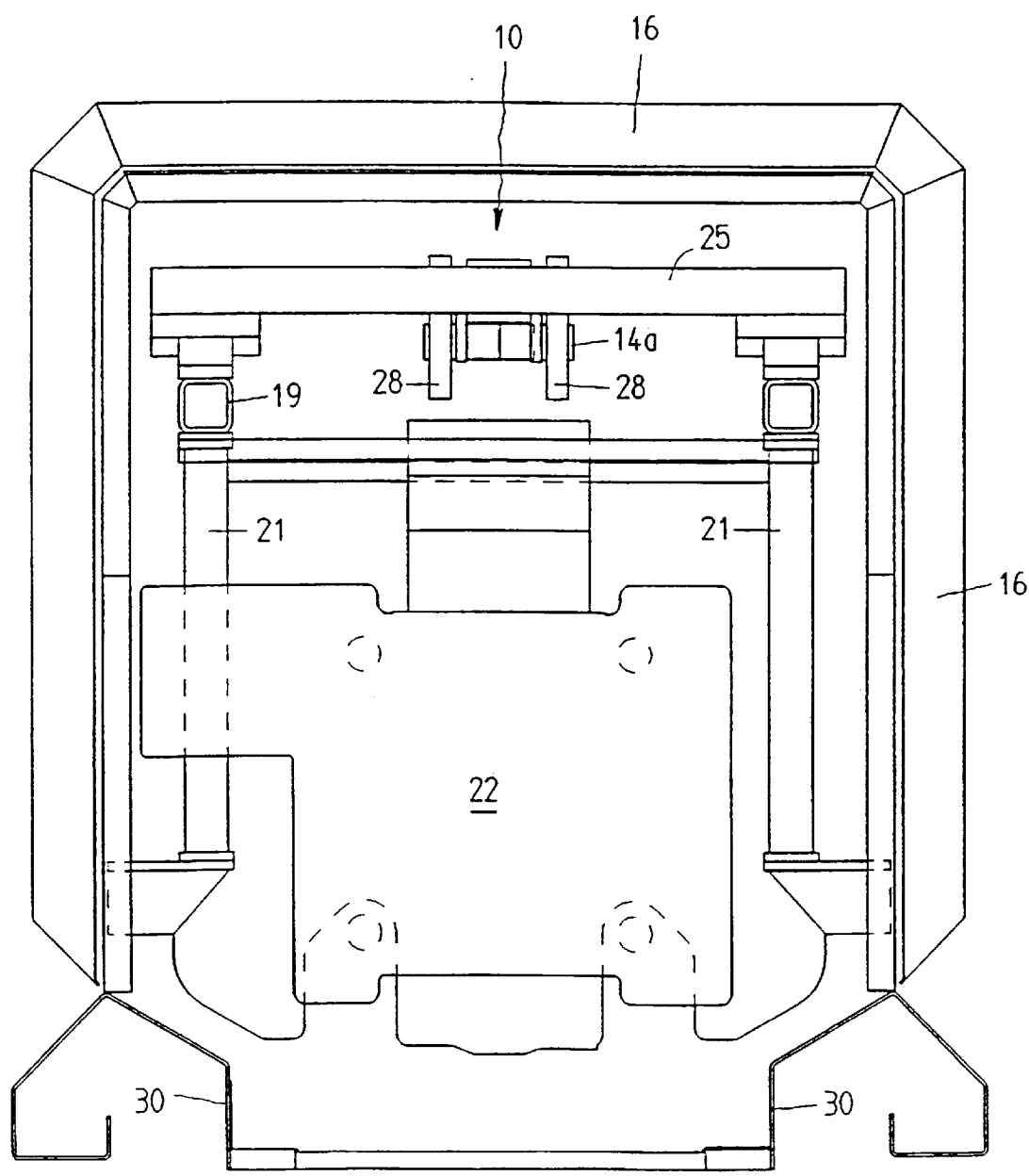
FIG. 6 A view from the back of the mold-clamping unit according to FIG. 3, which is provided with a protective device.

In FIG. 5b, where the preceding position is shown with dashed lines, the same way as in the other Figures, the crank element 28 on the one hand is pulled back somewhat, whereas the drive unit 12 simultaneously has displaced the guide unit 14 slightly along the crank guide 15. While the opening lift for the mold still remains the same, the molded article 11 is thus removed gradually and in a nearly straight line from the injection mold M, as shown clearly in FIG. 5c. FIG. 5c clearly demonstrates the maximum opening lift required for this, which essentially corresponds to the lift required for inserting the extraction means 13 and removing the molded article 11 according to Figure 5a. In Figure 5d, the molded article 11 is removed in upward direction from the injection mold and the guide unit 14 is nearly in its opposite end position, which results in the extraction means 13 position, shown with dashed lines at the tope of FIG. 4.

In order to deposit the molded article 11, the drive unit is again moved in the opposite direction, wherein the extractor 10 is arranged on the guide block 14. At the end of this extractor, the extraction means 13 is positioned such that it can pivot around an axis A that is arranged at a right angle to the clamping axis s—s. FIG. 4 clearly demonstrates these options.

It is understood that this description can be subjected to various modifications, changes and adaptations, which are within the range of equivalents for the pending claims.

What is claimed is:

1. An injection-molding machine for processing plastifiable compounds, comprising:
    a mold-clamping unit for accommodating an injection mold, the mold clamping unit including a mold clamping chamber and a clamping mechanism for opening and closing the injection mold in the mold clamping chamber in a direction of a clamping axis;
    an extractor comprising an extraction means for removing articles produced during an injection molding process from an opened injection mold;
    a crank element with a crank guide defining a guide path curved away from the clamping axis and having a longitudinal extension substantially parallel to the clamping axis;
    a drive unit for moving the extractor along the crank guide, said drive unit having a driving movement and including a first end and a second end, said driving movement being substantially parallel to the clamping axis and the longitudinal extension of the crank guide; and
    a guide unit connected to the drive unit and the extractor, said guide unit being guided at least at two locations on the crank guide,
    wherein the first end of the drive unit is pivotably attached to the crank element and the second end of the drive unit is attached with hinges to the guide unit, and wherein the driving movement of the drive unit moves the guide unit along the guide path, for moving the extraction means in and out of the injection mold.

2. An injection-molding machine according to claim 1, wherein the crank guide is substantially planar.

3. An injection-molding machine according to claim 1, wherein the extractor and the drive unit are essentially arranged inside a projection of the injection-molding machine that is directed lateral to the clamping axis.

4. An injection-molding machine according to claim 1, wherein the extractor, together with the drive unit and including an associated movement space, is arranged inside a space predetermined by a standard protective device of the mold-clamping unit.

5. An injection-molding machine according to claim 1, wherein the extraction means is a gripper.

6. An injection-molding machine according to claim 5, further comprising separate drive means for activating the gripper.

7. An injection-molding machine according to claim 1, including a carriage moveable in the direction of the clamping axis, the drive unit being arranged on the carriage.

8. An injection-molding machine according to claim 1, wherein the guide unit supports the extractor, said extraction means is arranged at an end of said extractor and is pivotable around a pivot axis, said pivot axis being arranged at a right angle to the clamping axis.

9. An injection-molding machine according to claim 1, wherein the mold clamping unit has a longitudinal extension, the injection-molding machine further comprising at least one carrier crosspiece extending parallel to the closing axis and past the longitudinal extension of the mold-clamping unit, and the drive unit is moveable along the at least one carrier crosspiece.

10. An injection-molding machine according to claim 9, wherein the at least one carrier crosspiece comprises first and second carrier crosspieces, the mold clamping unit includes a fixed support for the clamping mechanism and a moveable mold support, the injection-molding machine further includes front and rear crosspiece supports, said moveable mold carrier being moveable between a forward and a rear position to close and open the mold clamping chamber, the first and second carrier crosspieces being supported above the mold-clamping unit by the crosspiece supports, said rear crosspiece support being arranged adjacent to the fixed support, and said front support crosspiece being located behind the rear position of the movable mold support.

11. An injection-molding machine according to claim 10, wherein the extractor has a extracting position for extracting the articles and a depositing position for depositing the articles, the depositing position being at least one of above and behind the mold-clamping unit; and the first and second carrier crosspieces further include guide rails and a cross slide, the cross slide supporting the extractor and being moveable on the guide rails to move the extractor between the extracting position and the depositing position.

* * * * *

UNITED STATES PATENT AND TRADEMARK OFFICE
CERTIFICATE OF CORRECTION

PATENT NO.   : 6,386,859 B1　　　　　　　　　　　　　　　　　　　　　Page 1 of 1
DATED        : May 14, 2002
INVENTOR(S)  : Karl Hehl It is certified that error appears in the above-identified patent and that said Letters Patent is hereby corrected as shown below:

<u>Title page,</u>
Item [30], should read -- [30] April 15, 1996 (DE)................196 14 804 --

Signed and Sealed this

Twenty-fourth Day of September, 2002

*Attest:*

*Attesting Officer*

JAMES E. ROGAN
*Director of the United States Patent and Trademark Office*